United States Patent
Fenelon

(10) Patent No.: US 7,536,393 B1
(45) Date of Patent: May 19, 2009

(54) SYSTEMS FOR SCHEMA-FACILITATED DEVICE CAPABILITY DISCOVERY

(75) Inventor: Michael P Fenelon, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 232 days.

(21) Appl. No.: 10/978,934

(22) Filed: Nov. 1, 2004

Related U.S. Application Data

(63) Continuation of application No. 10/948,056, filed on Sep. 23, 2004.

(51) Int. Cl.
G06F 7/00 (2006.01)
G06F 17/30 (2006.01)
G06F 17/00 (2006.01)

(52) U.S. Cl. .................................. 707/100; 707/3
(58) Field of Classification Search ................ 707/100, 707/3
See application file for complete search history.

(56) References Cited

U.S. PATENT DOCUMENTS

| 5,862,325 | A | 1/1999 | Reed et al. | |
| 6,223,184 | B1 | 4/2001 | Blackman et al. | |
| 6,397,125 | B1 | 5/2002 | Goldring et al. | |
| 6,426,798 | B1 | 7/2002 | Yeung | |
| 6,490,589 | B1 | 12/2002 | Weider et al. | |
| 6,520,616 | B1* | 2/2003 | Parks et al. | 347/19 |
| 6,529,899 | B1 | 3/2003 | Kraft et al. | |
| 6,546,381 | B1 | 4/2003 | Subramanian et al. | |
| 6,556,983 | B1 | 4/2003 | Altschuler et al. | |
| 6,564,370 | B1 | 5/2003 | Hunt | |
| 2002/0054350 | A1* | 5/2002 | Kakigi et al. | 358/1.16 |
| 2002/0157041 | A1* | 10/2002 | Bennett et al. | 714/43 |
| 2002/0184342 | A1* | 12/2002 | Kennedy et al. | 709/219 |
| 2003/0033368 | A1* | 2/2003 | Tominaga | 709/203 |
| 2003/0135571 | A1* | 7/2003 | Sato | 709/206 |
| 2005/0050013 | A1* | 3/2005 | Ferlitsch | 707/3 |
| 2005/0177590 | A1* | 8/2005 | Chen et al. | 707/102 |

FOREIGN PATENT DOCUMENTS

| JP | 05094417 A | * | 4/1993 |
| JP | 2002331728 A | * | 11/2002 |
| JP | 2003067420 A | * | 3/2003 |

OTHER PUBLICATIONS

Page 1 of "XP releaased; do you need it?" published on Oct. 25, 2001 and archived at: http://web.archive.org/web/20041011052104/http://news.com.com/XP+released+Do+you+need+it/2100-1001_3-274947.html.*

(Continued)

Primary Examiner—Debbie M Le
Assistant Examiner—Harold A Hotelling

(57) ABSTRACT

Methods and systems use a standard schema to describe the capabilities of a peripheral device, such as a printer device, in a structured and easily discoverable way. The schema can allow different peripheral device implementations to describe their capabilities in a consistent way to those entities that might query for the capabilities. The schema syntax can allow for direct querying of individual values, as well as for querying whole sections of the schema so that an accurate and complete understanding of the device can be gleaned.

35 Claims, 3 Drawing Sheets

OTHER PUBLICATIONS

"Understanding Color Profiles in Microsoft Windows XP" by Joshua Weisberg published Jul. 7, 2006.*

Page 1 of Microsoft documentation of the Windows XP operating system retrieved on Nov. 20, 2006: http://www.microsoft.com/resources/documentation/windows/xp/all/proddocs/en-us/print_c_properties.mspx?mfr=true.*

Documentation (retrieved on Nov. 21, 2006) on the jetadmin software installable on the XP operating system: p. 8 of: h20338.www2.hp.com/Hpsub/downloads/WJA_Device_Cache_Export.pdf p. 1 of: http://h20338.www2.hp.com/Hpsub/cache/332272-0-0-225-121.html http://forums1.itrc.hp.com/service/forums/bizsupport/questionnanswer.do?threadId=146244.*

Pages 5, 14, and 15 of documentation (retrieved on Nov. 21, 2006) of the Xerox Fiery EXP4110 printer software available at: download.support.xerox.com/pub/docs/XRIP_EFI_EXP4110/userdocs/any-os/en/PrintOptions.pdf.*

Page 2 of the following web page retrieved on Nov. 21, 2006 onthe Jetadmin software installable on the XP operating system: http://h20338.www2.hp.com/Hpsub/cache/339003-0-0-225-121.html.*

Pan, A.; "A Model for Advanced Query Capability Description in Mediator Systems", Proceedings of the Fourth International Conference on Enterprise Information Systems, vol. 1., 2002. pp. 140-147.

"Device Cache Export of HP Web Jetadmin", http://h20338.www2.hp.com/Hpsub/downloads/WJA_Device_Cache_Export.pdf, 8, Nov. 2002.

"Software Technical Reference for HP LaserJet 8150 Series Printers", available at http://h20000.www2.hp.com/bc/docs/support/SupportManual/bp108729/bp108729.pdf, 2 pages.

"Non Final Office Action", U.S. Appl. No. 10/978,935, (Feb. 6, 2009), 23 pages.

* cited by examiner

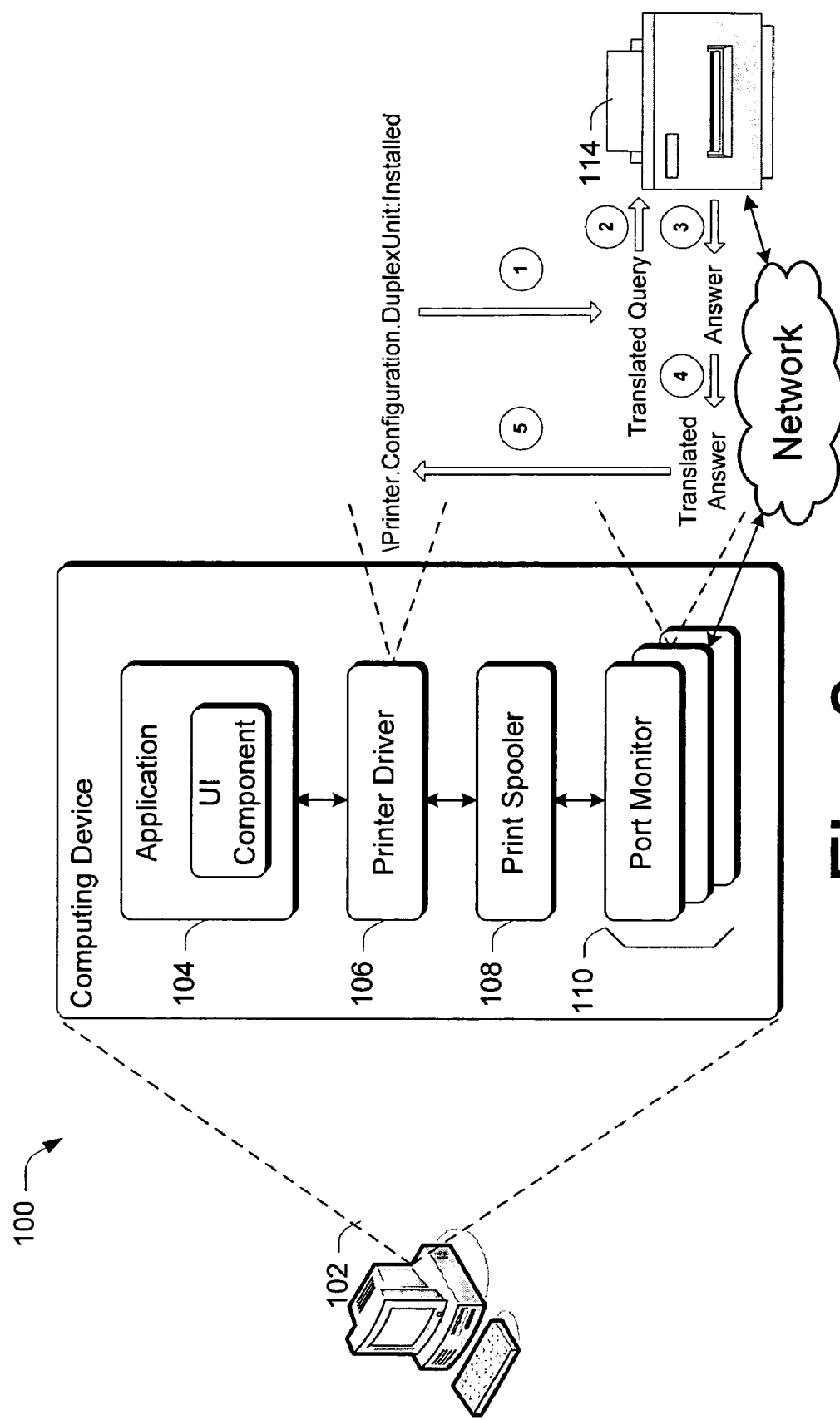

SYSTEMS FOR SCHEMA-FACILITATED DEVICE CAPABILITY DISCOVERY

RELATED APPLICATION

This application is a continuation of and claims priority to U.S. patent application Ser. No. 10/948,056, filed on Sep. 23, 2004, the disclosure of which is incorporated by reference herein.

TECHNICAL FIELD

This invention relates to discovering device capabilities.

BACKGROUND

Discovering the capabilities of peripheral devices, such as printers and other devices, that are connected to a computer can be, and typically is largely dependent upon the specific protocol that is used to connect and establish communication between the computer and the particular peripheral device. Capabilities can include such things as device features available for use, feature configuration, associated consumable type and supply and the like. Such protocol dependencies can encumber the capability discovery process because each protocol can have its own distinct dialect that must be used in order to query and receive information from a particular peripheral device. If a computer's particular device driver does not understand the dialect of a particular protocol, then the device driver may not be able to ascertain a full and complete understanding of a device's capabilities. This, in turn, can preclude the user from being exposed to the full suite of services and capabilities offered by a particular peripheral device.

Accordingly, this invention arose out of concerns associated with providing improved techniques for facilitating discovery of device capabilities.

SUMMARY

Methods and systems use a standard schema to describe the capabilities of a peripheral device, such as a printer device, in a structured and easily discoverable way. The schema can allow different peripheral device implementations to describe their capabilities in a consistent way to those entities that might query for the capabilities. The schema syntax can allow for direct querying of individual values, as well as for querying whole sections of the schema so that an accurate and complete understanding of the device can be gleaned.

BRIEF DESCRIPTION OF THE DRAWINGS

FIG. 3 illustrates an exemplary operating environment in conjunction with an exemplary communication flow in accordance with one embodiment.

DETAILED DESCRIPTION

Overview

Figure 1:
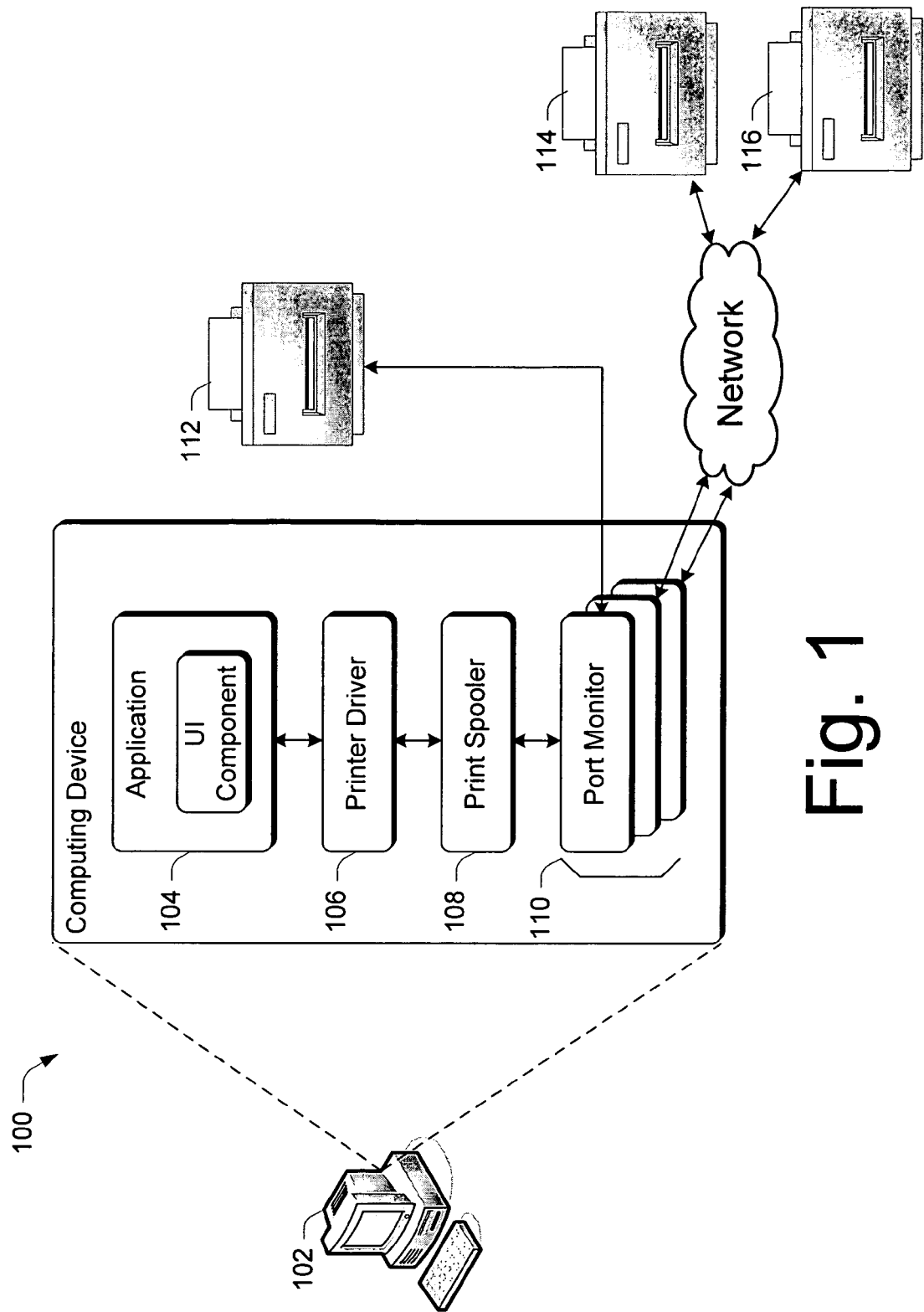
FIG. 1 illustrates an exemplary operating environment in which various embodiments can operate.

In the illustrated and described embodiment, a standard schema is used to describe the capabilities of a peripheral device, such as a printer device, in a structured and easily discoverable way. The schema can allow different peripheral device implementations to describe their capabilities in a consistent way to those entities that might query for the capabilities. The schema syntax can allow for direct querying of individual values, as well as for querying whole sections of the schema so that an accurate and complete understanding of the device can be gleaned.

In the illustrated and described embodiment, a peripheral device in the form of a printer device or printer is used to illustrate a specific schema construction and how the schema construction can be used to facilitate discovering the capabilities of a printer. It is to be understood, however, that utilization of the principles described in this document need not necessarily be limited to applications that only involve printers. Accordingly, the inventive principles described herein can be utilized with other peripheral devices without departing from the spirit and scope of the claimed subject matter.

In the specifically illustrated example below, the schema is protocol-independent in that the schema allows and can be used with multiple different connectivity methods (i.e. protocols). In addition, the schema can permit multiple vendor solutions to provide a common user experience for interacting with the printer.

In the context of the printing environment, the illustrated and described schema can be used to describe information about a printer which can be requested by a printer driver, an application or some other component. The schema also describes the format used to acquire the information, as will become apparent below.

Preliminarily, to visualize the schema, one can think of its elements as arranged in a tree-like structure in which, in accordance with at least some embodiments, there is no limit on the depth or breadth of the tree structure. A first or basic schema defines a standard or public set of schema elements. These elements can, however, be extended as by, for example, a hardware vendor who can extend the schema for special device requirements, as will become apparent below.

In accordance with one embodiment, to extend the schema, one might define a vendor specific schema value through use of a vendor unique prefix on a property or data element, as will become apparent below. The prefix can simply occur below the root level of the schema to create a whole vendor specific tree, or at a leaf node to add a vendor extension to a standard schema property.

Exemplary Operating Environment

Before describing aspects of the inventive schema in detail, the following discussion of an exemplary operating environment is provided to assist the reader in understanding where and how various aspects of the schema can be deployed and employed. It is to be understood that the description provided below constitutes but one example and is not intended to limit application of the schema to any one particular operating environment or any one particular peripheral device.

FIG. 1 shows an exemplary operating environment generally at 100 comprising a computing device 102 and various components within computing device 102. The computing device can comprise any suitable computing device such as a desk top computer, a laptop computer, a handheld computer, personal digital assistant (PDA) and the like. In this particular example, computing device 100 comprises one or more applications 104 which provide a user interface (UI) component that presents an interface to a user, a printer driver 106, a print spooler 108 and one or more port monitors 110. In this example, multiple port monitors are provided and each can be associated with a different connectivity type, such as a TCP/IP port monitor, a USB port monitor, and the like. Each port monitor can and typically does have its own protocol-associated dialect for communicating with peripheral devices.

Environment 100 also includes one or more printers. In this particular example, three such printers 112, 114, and 116 are shown. In this example, printer 112 comprises a local printer, and printers 114, 116 constitute network-accessible printers that are connected via a network which can comprise any suitable network such as a LAN, WAN and the like.

Application 104 can provide a UI component that enables a user to interact with a printer to, for example, ascertain printer capabilities and create print jobs for the printer through the printer driver 106.

Printer driver 106 communicates with both application 104 and print spooler 108. The printer driver 106 can receive calls from the application and makes calls to the print spooler 108 in the usual way. The printer driver 106 is typically involved in assisting in rendering print jobs by providing printer-specific drawing capabilities, sending rendered image data to the print spooler 108, and providing a user interface to the modifiable configuration parameters associated with printers and print documents, such as which input and output trays are selected, the number of copies, image resolution and orientation, and so on.

The print spooler 108 manages the printing process, as will be appreciated by the skilled artisan. Management of the printing process can involve retrieving the location of the correct printer driver, loading that driver, spooling high-level function calls into a print job, scheduling the print job for printing, and so on.

Port monitors 110 communicate with the print spooler 108 and receive from the spooler low-level commands which it can process and send to a local printer or over a network to a network-accessible printer.

In the explanation that follows, it is to be appreciated that various aspects of the described embodiments can be implemented in connection with computer-readable instructions embodied on one or more computer-readable media which, when executed, implement methods of capability discovery. These computer-readable media can be embodied on the computing device or, where appropriate, the printer.

Exemplary Schema Definition

In the illustrated and described embodiment, the exemplary schema comprises a hierarchical description of a printer's capabilities in the form of properties and values. By hierarchically describing the printer's properties and values, the schema can be grown and modified (i.e. extended) to allow different or additional characteristics of the printer to be described. Hence, the schema is easily extensible. In addition, by virtue of the schema's hierarchical description, a generally standardized view of the printer's capabilities is provided. Hence, discovering a printer's capabilities and properties can take place in a reasonable, regular and predictable way.

For example, if the user wishes to print a particular document on a certain size paper, then discovering the paper sizes does not require for an entire description of the printer to be read and analyzed. Rather, the appropriate software knows, by virtue of the schema hierarchy, which nodes of the hierarchy are associated with paper size and, accordingly, in one request can specify the node or nodes and receive back an entire list of paper sizes. This makes it easier for applications to pull specific information about the printer. Further, multiple instances of information (such as multiple input or output bins) can all be grouped together and hence discovered in an easy and straight forward manner.

Additionally, the schema provides a level of standardization or consistency across the entire description of a device. That is, the schema provides a structured syntax which, depending on the schema string that is received responsive to a query, informs the recipient whether it is receiving back a node which can have additional information under it, or a leaf or data value. This will become more apparent below.

In the illustrated and described embodiment, the following definitions apply to elements or nodes of the schema. A property refers to a node inside the hierarchical tree. A property node can have zero or more children, and can have other properties and data as children. A property node may contain a list of values or other properties and can represent a feature, a compound feature or a print system attribute (such as driver name). Data, as used in the context of the schema itself, refers to a single piece or homogeneous list of data. Data is composed of a data name, a data type, and a data value. Data is referenced by data name, and only under properties, e.g. "\Printer.Finishing.Staple:Installed". Data does not have children and it constitutes a leaf node. A Property Path refers to a path to a property and the "." is used as the delimiter. A Data Path refers to a path to a data element and the ":" is used as the delimiter to indicate retrieval of data.

The discussion now turns first to a presentation of the structure of the inventive schema, followed by a discussion of the individual elements of the schema with examples of how the schema can be used to build or create queries.

Structure of the Schema

The following constitutes the structure of the inventive schema in accordance with one embodiment:

Printer
  DeviceInfo
    FriendlyName
    Manufacturer
    ModelName
    Location
    Comment
  Configuration
    Memory
      Size
      PS
    HardDisk
      Installed
      Capacity
      FreeSpace
    DuplexUnit
      Installed
  Consumables
    [Type]
      [Color]
        Installed
        DisplayName
        Level
  Layout
    NumberUp
      PagesPerSheet
        CurrentValue
        Supported
      Direction
        CurrentValue
        Supported
    Orientation
      CurrentValue
      Supported
    Resolutions
      CurrentValue
      Supported
    InputBins
      CurrentValue
      [TrayName]

```
         Installed
         DisplayName
         MediaSize
         MediaType
         MediaColor
         FeedDirection
         Capacity
         Level
   Finishing
      CollationSupported
      JogOffsetSupported
      Staple
         Installed
         Location
            CurrentValue
            Supported
         Angle
            CurrentValue
            Supported
      HolePunch
         Installed
         Pattern
            CurrentValue
            Supported
         Location
            CurrentValue
            Supported
         Edge
            CurrentValue
            Supported
      OutputBins
         CurrentValue
         [TrayName]
            Installed
            DisplayName
            Capacity
            Level
   Status
      Summary
         State
         StateReason
      Detailed
         Event1
            Name
            Component
            Group
            Name
            Severity
            ...
         Eventx
```

In the example above, all non-italic labels are Properties. In addition, all italic labels are Data Values. All labels surrounded by "[ ]" are generated based on data from the device or from bi-di mapping files. Examples of bi-di mapping files are provided in co-pending U.S. patent application Ser. No. 10/608,410, filed on Jun. 30, 2003, the disclosure of which is incorporated by reference herein.

In the illustrated and described embodiment, Consumables (a child of the root Printer node) are treated as a special case. Not all consumable items have a [Color]. If this is the case, the Property name is not added, and the values all hang off the [Type] node.

Figure 2:
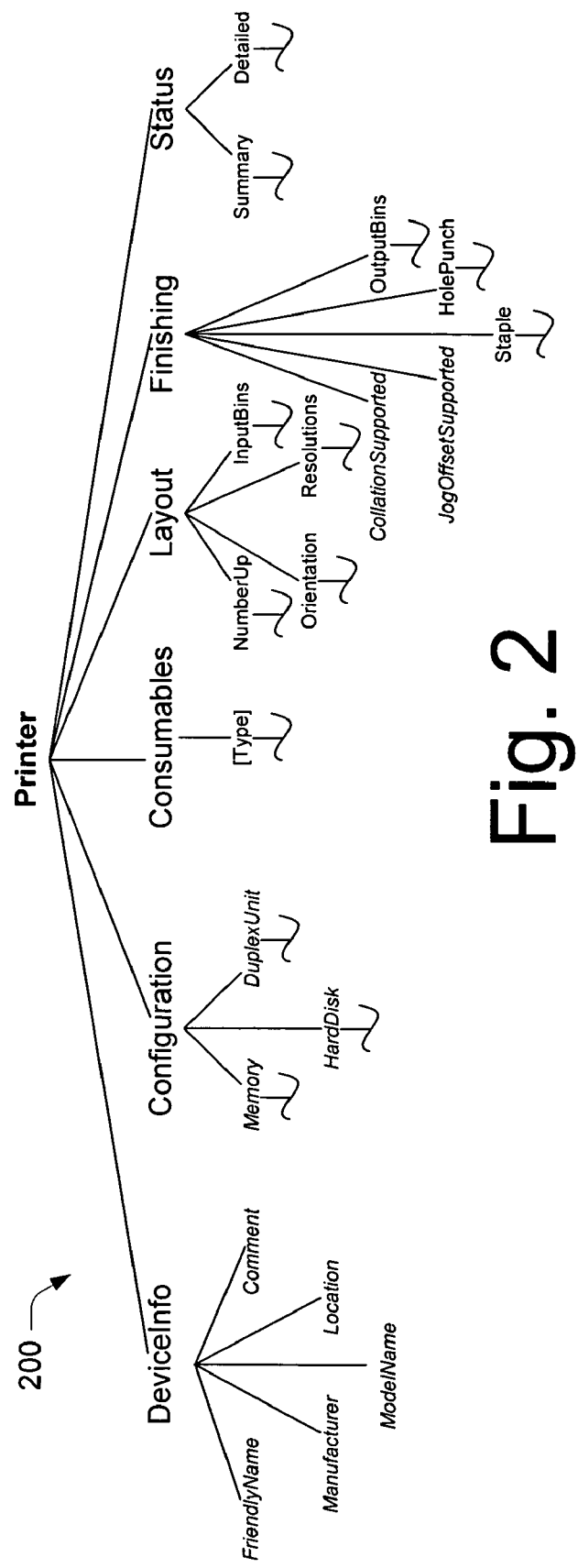
FIG. 2 illustrates a portion of an exemplary schema in tree-like form in accordance with one embodiment.

FIG. 2 illustrates a portion of the schema in tree-like form generally at 200. Individual nodes or elements of the schema illustrated in FIG. 2 correspond to the nodes or elements listed just above. In this illustration, the parent/child relationship can be seen between individual nodes. In this example, the root node or element is "Printer" and its children are "DeviceInfo", "Configuration", "Consumables", "Layout", "Finishing" and "Status". The children of each of these nodes or elements are illustrated just beneath its corresponding parent. For example, the children of "DeviceInfo" (i.e. "FriendlyName", "Manufacturer", "ModelName", "Location" and "Comment") are illustrated beneath "DeviceInfo". Children that appear at the next level are not illustrated because of spacing constraints. However, for those nodes or elements that have further children, such is indicated by the truncated line extending below the particular node or element. For example, the "Memory" node or element (whose parent is "Configuration" whose parent is, in turn, "Printer") has a truncated line extending below it to represent its children (i.e. "Size" and "PS").

Individual Elements of the Schema

In the discussion that follows, the individual elements of the exemplary schema are described in relation to their context and meaning within the schema.

Printer

The Printer element or node is a property type node and constitutes the top level property node. The Printer node denotes the start of every schema value. Its full schema path, which can be specified in queries, is "\Printer". In this embodiment, the Printer node has six children each of which constitutes a schema section heading: DeviceInfo, Configuration, Consumables, Layout, Finishing, and Status, each of which is discussed below under its own heading.

DeviceInfo

DeviceInfo, a child of the Printer element or node, is a property node type and constitutes a schema section heading. This section of schema deals with or pertains to data that is associated with the device as a whole. Much of this data can be set by the user or administrator to personalize their device. The full schema path is "\Printer.DeviceInfo". In this embodiment, the DeviceInfo schema heading has five children: FriendlyName, Manufacturer, ModelName, Location and Comment, each of which is discussed below.

The FriendlyName element is a value node type whose data type is a string. This element is a user created or settable name that identifies the device. Its full schema path is "\Printer.DeviceInfo:FriendlyName".

The Manufacturer element is a value node type whose data type is a string. This element is the name of the device manufacturer. Its full schema path is "\Printer.DeviceInfo:Manufacturer".

The ModelName element is a value node type whose data type is a string. This element is the model name for the device including model number, but excluding the manufacturer name. Its full schema path is "\Printer.DeviceInfo:ModelName".

The Location element is a value node type whose data type is a string. This element describes the current location of the device and its full schema path is "\Printer.DeviceInfo:Location".

The Comment element is a value node type whose data type is a string. This element can contain information important to the administrator or organization in which the device resides. Its full schema path is "\Printer.DeviceInfo:Comment".

Configuration

Configuration, a child of the Printer element or node, is a property node type and constitutes a schema section heading. This schema section deals with or pertains to configuration data for the printing device. In this embodiment, this data only changes when the physical configuration of the device is modified, usually through changes in actual hardware. Its full schema path is "\Printer.Configuration". In this embodiment, the Configuration schema heading has three children: Memory, HardDisk, and Consumables, each of which is discussed below.

The Memory element is a property node type and contains all the value entries that deal with the memory installed in the device. Its full schema path is "\Printer.Configuration.Memory". In this particular example, the Memory element has two children—Size and PS.

The Size element is a value node type whose data type is an integer whose value represents the amount of physical memory installed in the device. The unit for this value is Kilobytes (KB). The full schema path is "\Printer.Configuration.Memory:Size".

The PS element is a value node type whose data type is an integer whose value represents the amount of memory available to the Postscript interpreter in the device. This should be a subset of the physical memory installed. The unit for this value is Kilobytes (KB). The full schema path is "\Printer.Configuration.Memory:PS".

The HardDisk element is a property node type and contains all the value entries that deal with the possible hard disk installed in the device. Its full schema path is "\Printer.Configuration.HardDisk". The HardDisk element has three children—Installed, Capacity and FreeSpace, each of which is discussed below.

The Installed element is a value node type whose data type is Boolean. This value represents whether or not a hard disk is installed on the device. The full schema path is "\Printer.Configuration.HardDisk:Installed".

The Capacity element is a value node type whose data type is an integer whose value represents the capacity of the installed hard disk. The unit for this value is Megabytes (MB). The full schema path is "\Printer.Configuration.HardDisk:Capacity".

The FreeSpace element is a value node type whose data type is an integer whose value represents the currently available free space of the installed hard disk. The unit for this value is Megabytes (MB). The full schema path is "\Printer.Configuration.HardDisk:FreeSpace".

The DuplexUnit element is a property node type that contains all the value entries that deal with the duplex print attachment for the device. Its full schema path is "\Printer.Configuration.DuplexUnit". The DuplexUnit element has one child—Installed.

The Installed element is a value node type whose data type is Boolean whose value represents whether or not a duplex print unit is installed on the device. Its full schema path is "\Printer.Configuration.DuplexUnit:Installed".

Consumables

Consumables, a child of the Printer element or node, is a property node type and constitutes a schema section heading. This schema section deals with or pertains to information about all of the consumable supplies in the device. This includes items used during the printing process but does not include the printable media. Its full schema path is "\Printer.Consumables". In this embodiment, the Consumables element has one child—[Type] which is discussed below.

The [Type] element is a property node type and constitutes a property name. In the illustrated and described embodiment, the property name can comprise a name that is provided or mapped by an Independent Hardware Vendor (IHV). The name corresponds to the type of consumable that the child nodes describe. In the illustrated and described embodiment, a number of predefined types are provided and include: ink, toner, developer, FuserOil, Wax, WasteToner, WasteInk, and WasteWax. In the illustrated and described embodiment, each IHV can add any values specific to their particular printing process/devices. The full schema path is "\Printer.Consumables.[Type]". The [Type] element can have children which, in this embodiment, is a [Color] element.

The [Color] element is a property node type and can constitute an IHV mapped property name. The name corresponds to the color of the consumable that the child nodes describe. This property is optional, since some types of consumable do not actually have a color associated with them. Each IHV can add any values specific to their printing process/devices. The full schema path is "\Printer.Consumables.[Type].[Color]". In this embodiment, this element has three children: Installed, DisplayName, and Level.

The Installed element is a value node type whose data type is Boolean. This value represents whether the consumable of [Type] and [Color] is installed on the device. The full schema path is "\Printer.Consumables.[Type].Color]:Installed".

The DisplayName element is a value node type whose data type is a string. This value represents the localized name that should be displayed for the currently referenced consumable. The full schema path is "\Printer.Consumables.[Type].Color]:DisplayName".

The Level element is a value node type whose data type is an integer whose value represents the current level of the referenced consumable. The unit for this value is percentage points. A full level would have a value of 100 and an empty level would have a value of 0. If the level is not measurable then a value of −1 (unknown) should be returned. The full schema path is "\Printer.Consumables.[Type].Color]:Level".

Layout

Layout, a child of the Printer element or node, is a property node type and constitutes a schema section heading. This section deals with data that is associated with how the print job is applied on the page. This includes what media is available and how to apply the information on each sheet. The full schema path is "\Printer.Layout". The element has four children: NumberUp, Orientation, Resolutions, and InputBins, each of which is discussed below.

The NumberUp element is a property node type and is the heading for the schema section that contains all the information about how many logical pages should be placed on a single page of media and also which direction to layout the multiple pages. The full schema path is "\Printer.Layout.NumberUp". In this embodiment, this element has two children: PagesPerSheet and Direction.

The PagesPerSheet element is a property node type and contains all the value entries that deal with how many data stream pages should be placed on a single side of the selected media. The full schema path is "\Printer.Layout.NumberUp.PagesPerSheet". This element has two children: CurrentValue and Supported.

The CurrentValue element is a value node type whose data type is an integer. This value represents the current (default) number of data stream pages that should be placed on a single side of the selected media. The full schema path is "\Printer.Layout.NumberUp.PagesPerSheet:CurrentValue".

The Supported element is a value node type whose data type is a string. This value is a comma separated list of all the values supported for PagesPerSheet. The full schema path is "\Printer.Layout.NumberUp.PagesPerSheet:Supported".

The Direction element is a property node type and contains all the value entries that deal with which order/direction to place the logical pages on the media. Each possible value consists of an X direction and a Y direction. The full schema path is "\Printer.Layout.NumberUp.Direction". This element has two children: CurrentValue and Supported.

The CurrentValue element is a value node type whose data type is a string. This value represents the current (default) direction to layout the logical page(s). In the illustrated and described embodiment, examples of allowed values include: RightDown, DownRight, LeftDown and DownLeft. The full schema path is "\Printer.Layout.NumberUp.Direction:CurrentValue".

The Supported element is a value node type whose data type is a string. This value is a comma separated list of all the values supported for Direction. The full schema path is "\Printer.Layout.NumberUp.Direction:Supported".

The Orientation element, a child of the Layout element, is a property node type and contains all the value entries that deal with what orientation the pages should be printed. The full schema path is "\Printer.Layout.Orientation". This element has two children: CurrentValue and Supported.

The CurrentValue element is a value node type which data type is a string. This value represents the current (default) orientation in which pages will be printed. In the illustrated and described embodiment, allowed values include Portrait, Landscape, ReversePortrait and ReverseLandscape. The full schema path is "\Printer.Layout.Orientation:CurrentValue".

The Supported element is a value node type whose data type is a string. This value is a comma separated list of all the values supported for Orientation. The full schema path is "\Printer.Layout.Orientation:Supported".

The Resolutions element, a child of the Layout element, is a property node type and contains all the value entries that deal with what print resolutions are supported by the device. All resolutions are in Dots per Inch (DPI). The full schema path is "\Printer.Layout.Resolutions". This element has two children: CurrentValue and Supported.

The CurrentValue element is a value node type whose data type is an integer. This value represents the current (default) value of the device print resolution. The full schema path is "\Printer.Layout.Resolutions:CurrentValue".

The Supported element is a value node type whose data type is a string. This value is a comma separated list of all the values supported for Resolutions. The full schema path is "\Printer.Layout.Resolutions:Supported".

The InputBins element, a child of the Layout element, is a property node type and is the heading for the section that contains all the information describing the device Input Bins. The full schema path is "\Printer.Layout.InputBins". This element has children that include Current Value and [TrayName].

The CurrentValue element is a value node type whose data type is an string. This value represents the current (default) Input Bin and corresponds to one of the [TrayName] values the print device currently supports. The full schema path is "\Printer.Layout.InputBins:CurrentValue".

The [TrayName] element is a property node type and constitutes an IHV provided or mapped property name. The name is the name that the IHV associates with the particular input bin. Examples include, without limitation, Tray1, Tray2, Trayxx (where xx is any number), TopBin, MiddleBin, BottomBin, LargeCapacityBin, ManualBin, EnvelopeBin, EnvelopeManual and MultiPurposeBin. The full schema path is "\Printer.Layout.InputBins.[TrayName]". In this embodiment, the [TrayName] element has the following children: Installed, DisplayName, MediaSize, MediaType, MediaColor, FeedDirection, Capacity and Level, each of which is described below.

The Installed element is a value node type whose data type is Boolean. This value represents whether the bin referenced by [TrayName] is installed on the device. The full schema path is "\Printer.Layout.InputBins.[TrayName]:Installed".

The DisplayName element is a value node type whose data type is a string. This value represents the localized name that should be displayed for the currently referenced input bin. The full schema path is "\Printer.Layout.InputBins.[TrayName] DisplayName".

The MediaSize element is a value node type whose data type is string. This value represents the size of the media available in the currently referenced input bin. In the illustrated and described embodiment, examples of allowed values include: na_legal__8.5×14 in, na_letter__8.5×11 in, iso_a4__210×297 mm, iso_c5__162×229 mm, iso_d1__110× 220 mm and jis_b4__257×364 mm. The values should conform to the IEEE-ISTO PWG Standard 5101.1-2001—Media Standardized Names. The full schema path is "\Printer.Layout.InputBins.[TrayName]:MediaSize".

The MediaType element is a value node type whose data type is a string. This value represents the type of the media available in the currently referenced input bin. In the illustrated embodiment, examples of allowed values include: cardstock, envelope, labels, photographic, stationery, stationery-inkjet, transparency and other. The values should conform to the IEEE-ISTO PWG Standard 5101.1-2001—Media Standardized Names. The full schema path is "\Printer.Layout.InputBins.[TrayName]:MediaType".

The MediaColor element is a value node type whose data type is a string. This value represents the color of the media available in the currently referenced input bin. In the illustrated embodiment, examples of allowed values include: white, pink, yellow, buff, goldenrod, blue, green, red, gray, ivory, orange, no-color and unknown. The values should conform to the IEEE-ISTO PWG Standard 5101.1-2001—Media Standardized Names. The full schema path is "\Printer.Layout.InputBins.[TrayName]:MediaColor".

The FeedDirection element is a value node type whose data type is a string. This value represents which edge of the paper enters the media path first in the currently referenced input bin. In the illustrated embodiment, examples of allowed values include: LongEdgeFirst and ShortEdgeFirst. The full schema path is "\Printer.Layout.InputBins.[TrayName]:FeedDirection".

The Capacity element is a value node type whose data type is an integer. This value represents capacity in sheets of the currently referenced input bin. The full schema path is "\Printer.Layout.InputBins.[TrayName]:Capacity".

The Level element is a value node type whose data type is an integer. This value represents the percent of capacity remaining in the currently referenced input bin. The unit for this value is percentage points. A full tray would have a value of 100 and an empty tray would have a value of 0. If the level is not measurable then a value of −1 (unknown) should be returned. The full schema path is "\Printer.Layout.InputBins.[TrayName]:Level".

Finishing

Finishing, a child of the Printer element or node, is a property node type and constitutes a schema section heading. This schema section deals with data that is associated with how a print job can be composed upon completion. This includes whether the document can be collated, stapled or punched. The full schema path is "\Printer.Finishing". The element has the following children: CollationSupported, JogOffsetSupported, Staple, HolePunch, and OutputBins, each of which is discussed below.

The CollationSupported element is a value node type whose data type is a Boolean. This value represents whether the printer supports hardware collation of printed documents. The full schema path is "\Printer.Finishing.CollationSupported".

The JogOffsetSupported element is a value node type whose data type is a Boolean. This value represents whether the printer supports offsetting separate copies of a print job or separate print jobs in the output trays. The full schema path is "\Printer.Finishing.JogOffsetSupported".

The Staple element is a property node type and is the heading for the schema section that contains all the information describing the device Stapler. This element has the following children: Installed, Location, and Angle, each of which is discussed below. The full schema path is "\Printer.Finishing.Staple".

The Installed element is a value node type whose data type is a Boolean. This value represents whether the print device has a stapler feature installed. The full schema path is "\Printer.Finishing.Staple:Installed".

The Location element is a property node type that contains all the value entries that deal with the location that staples can be applied to output pages. The full schema path is "\Printer.Finishing.Staple.Location". This element has two children: CurrentValue and Supported, each of which is discussed below.

The CurrentValue element is a value node type whose data type is a string. This value represents the current (default) location that staples would be applied. in the illustrated embodiment, allowed values include: TopLeft, BottomLeft, TopRight, BottomRight, Other and Unknown. The full schema path is "\Printer.Finishing.Staple.Location:CurrentValue".

The Supported element is a value node type whose data type is a string. This value is a comma separated list of all the values supported for staple Location. The full schema path is "\Printer.Finishing.Staple.Location:Supported".

The Angle element, which is a child of the Staple element, is a property node type and contains all the value entries that deal with the angle that staples can be applied to output pages. The full schema path is "\Printer.Finishing.Staple.Angle". This element has two children: CurrentValue and Supported, each of which is discussed below.

The CurrentValue element is a value node type whose data type is a string. This value represents the current (default) location that staples would be applied. In the illustrated embodiment, allowed values include: Horizontal, Vertical, Slanted and unknown. The full schema path is "\Printer.Finishing.Staple.Angle:CurrentValue".

The Supported element is a value node type whose data type is a string. This value is a comma separated list of all the values supported for staple Angle. The full schema path is "\Printer.Finishing.Staple.Angle:Supported".

The HolePunch element, a child of the Finishing element, is a property node type and is the heading for the schema section that contains all the information describing the device Hole Punch attachment. The full schema path is "\Printer.Finishing.HolePunch". This element has four children: Installed, Pattern, Location and Edge, each of which is discussed below.

The Installed element is a value node type whose data type is a Boolean. This value represents whether the print device has a hole punch feature installed. The full schema path is "\Printer.Finishing.HolePunch:Installed".

The Pattern element is a property node type and contains all the value entries that deal with the hole punch patterns that can be punched into output pages. The full schema path is "\Printer.Finishing.HolePunch.Pattern". this element has two children: CurrentValue and Supported, each of which is discussed below.

The CurrentValue element is a value node type whose data type is a string. This value represents the current (default) hole punch pattern that would be applied to the output pages. In the illustrated embodiment, allowed values include: TwoHoleUSTop, ThreeHoleUS, TwoHoleDIN, FurHoleDIN, TwentyTwoHoleUS, NineteenHoleUS, ToHoleMetric, Swedish4Hole, TwoHoleUSSide, FiveHoleUS, SevenHoleUS, Mixed7H4S, Norweg6Hole, Metric26Hole, Metric30Hole and unknown. The full schema path is "\Printer.Finishing.HolePunch.Pattern:CurrentValue".

The Supported element is a value node type whose data type is a string. This value is a comma separated list of all the values supported for Hole Punch Pattern. The full schema path is "\Printer.Finishing.HolePunch.Pattern:Supported".

The Edge element is a property node type and contains all the value entries that deal with paper edges that holes can be punched into output pages. The full schema path is "\Printer.Finishing.HolePunch.Edge". This element has two children: CurrentValue and Supported, each of which is discussed below.

The CurrentValue element is a value node type whose data type is a string. This value represents the current (default) paper edge in which holes will be punched. In the illustrated embodiment, allowed values include: Top, Bottom, Left and Right. The full schema path is "\Printer.Finishing.HolePunch.Edge:CurrentValue".

The Supported element is a value node type whose data type is a string. This value is a comma separated list of all the values supported for hole punch Edge. The full schema path is "\Printer.Finishing.HolePunch.Edge:Supported".

The OutputBins element, a child of the Finishing element, is a property node type and is the heading for the schema section that contains all the information describing the device output bins. Its full schema path is "\Printer.Finishing.OutputBins". This element has two children: CurrentValue and [TrayName], each of which is discussed below.

The CurrentValue element is a value node type whose data type is an string and corresponds to one of the [TrayName] values the print device currently supports. This value represents the current (default) Output Bin. The full schema path is "\Printer.Finishing.OutputBins:CurrentValue".

The [TrayName] element is a property node type and constitutes an IHV-provided or mapped property name. The name is the name that the IHV associates with the particular output. In the illustrated embodiment, examples of names include: OutputBin1, OutputBin2, OutputBinxx (where xx is any number), TopBin, MiddleBin, BottomBin, LargeCapacityBin, FaceUpBin, FaceDownBin and MailboxBin. The full schema path is "\Printer.Finishing.OutputBins.[TrayName]". In the illustrated embodiment, this element has four children, each of which is discussed below: Installed, DisplayName, Capacity and Level.

The Installed element is a value node type whose data type is Boolean. This value represents whether the bin referenced by [TrayName] is installed on the device. The full schema path is "\Printer.Finishing.OutputBins.[TrayName]:Installed".

The DisplayName element is a value node type whose data type is a string. This value represents the localized name that should be displayed for the currently referenced input bin. The full schema path is "\Printer.Finishing.OutputBins.[TrayName]:DisplayName".

The Capacity element is a value node type whose data type is an integer. This value represents capacity in sheets of the currently referenced input bin. The full schema path is "\Printer.Finishing.OutputBins.[TrayName]:Capacity".

The Level element is a value node type whose data type is an integer. This value represents percent of capacity remaining in the currently referenced input bin. The unit for this value is percentage points. A full tray would have a value of 1100 and an empty tray would have a value of 0. If the level is not measurable then a value of −1 (unknown) should be returned. The full schema path is "\Printer.Finishing.Output-Bins.[TrayName]:Level".

Status

Status, a child of the Printer element or node, is a property node type and constitutes a schema section heading. This schema section deals with the current state of the print device. The full schema path is "\Printer.Status". In the illustrated embodiment, this element has two children: Summary and Detailed, each of which is discussed below.

The Summary element is a property node type and contains all the value entries that deal with a summary of the current state. This gives a high level look at the device status. In the illustrated embodiment, only the most serious conditions are reflected. The full schema path is "\Printer.Status.Summary". This element has two children: State and StateReason, each of which is discussed below.

The State element is a value node type whose data type is a string. This value represents the processing state of the device. In the illustrated embodiment, allowed values include: Idle, Processing and Stopped. The full schema path is "\Printer.Status.Summary:State".

The StateReason element is a value node type whose data type is a string. This value represents the most important reasons for the current Printer state. This value could be a list of space delimited state reasons below. In the illustrated embodiment, allowed values include: AttentionRequired, DoorOpen, MarkerSupplyEmpty, MarkerSupplyLow, MediaEmpty, MediaJam, MediaLow, MediaNeeded, None, Paused, OutputAreaAlmostFull and OutputAreaFull. The full schema path is "\Printer.Status.Summary:StateReason".

The Detailed element is a property node type and contains all the property and value entries that deal with a detailed list of all problem or information conditions active in the device currently. The full schema path is "\Printer.Status.Detailed". This element has one child: Event, which is discussed below.

The Event### element is a property node type and is a generated name based on an event's ID in the device. Each ### should be unique for a given event. The device should not re-use the ### for a period of time to allow any application to figure out that an event has gone away. This property will contain all the value entries that describe the event in question. The full schema path is "\Printer.Status.Detailed.Event###". In the illustrated embodiment, this element has three children: Name, Component and Severity, each of which is discussed below.

The Name element is a value node type whose data type is a string. This value represents the name of the current event. This name describes the type of the current error condition. There are different event names for each component. In the illustrated embodiment, some values include: CoverOpen, Jam, DoorOpen, InputTrayMissing, InputTrayMediaSizeChange, InputTrayMediaTypeChange, InputTraySupplyLow, InputTraySupplyEmpty, OutputTrayMissing, OutputTrayAlmostFull, OutputTrayFull, FuserUnderTemperature, FuserOverTemperature, ConsumableLow, ConsumableEmpty, WasteReceptacleAlmostFull and WasteReceptacleFull. The full schema path is "\Printer.Status.Summary:Detailed.Event###.Component:Name".

The Component element is a value node type whose data type is a property. This property contains the value entries which describe what part of the print device is affected by the current event. The full schema path is "\Printer.Status.Summary:Detailed.Event###.Component". This element has two children: Group and Name, each of which is discussed below.

The Group element is a value node type whose data type is a string. This value represents the component group that is affected by the current event. The component group and component name (below) are combined to determine the exact location of the problem. In the illustrated embodiment, some values include: InputBin, Mediapath, OutputBin and Consumable. The full schema path is "\Printer.Status.Summary:Detailed.Event###.Component:Group".

The Name element is a value node type whose data type is a string. This value represents the name of the individual component that is affected by the current event. The component name and component group (above) are combined to determine the exact location of the problem. In the illustrated embodiment, exemplary values include: Tray1, TopBin, LargeCapacityBin, OutputBin1, Toner.Black and Ink.Cyan. The full schema path is "\Printer.Status.Summary:Detailed.Event###:Name".

The Severity element is a value node type whose data type is Boolean. This value represents the level of severity of the current Event Entry. The printer determines the severity level assigned to error condition. In the illustrated embodiment, allowed values include: Informational, Warning and Critical. The full schema path is "\Printer.Status.Summary:Detailed.Event###:Severity".

Schema in Use

Having described an exemplary schema above, consider now how the schema can be used to discover a printer's capabilities in the context of the operating environment of FIG. 1.

Specifically, FIG. 3 shows the FIG. 1 operating environment of FIG. 1 along with an illustrated communication flow that takes place with a single network-accessible printer. It is to be understood that the illustrated communication flow (aspects of which are represented with encircled numbers) constitutes a communication flow that is specific to the FIG. 1 operating environment. Other communication flows can take place and may differ depending on the operating environment. One such example of a different operating environment is given below.

In the illustrated example, printer driver 106 understands the schema and how to craft queries to ascertain the capabilities of printer 114. The printer driver builds queries and passes the queries down to the print spooler 108 which, in turn, passes the queries to the appropriate port monitor 110. Recall that the port monitors can be associated with a particular connectivity type, such as TCP/IP and the like. When the port monitor receives the schema query, it translates the query into a protocol-specific format and then communicates the query to the printer using the appropriate protocol-specific format. The printer then receives the query and provides an answer in a format understood by the port monitor. When the port monitor receives the answer, it processes the answer and translates it into a schema-appropriate form that it can then return to the printer driver through the print spooler.

As a specific example, consider the following. Application 104 wishes to ascertain whether a duplexer is installed on printer 114 so that it can present an accurate user interface to a user so that the user can fully utilize all of the printer's features. In this case, the printer driver builds a schema query as follows:

"\Printer.Configuration.DuplexUnit:Installed".

This schema query is directed to ascertaining a data value (i.e. Installed) that indicates whether a duplexer is installed. Recall from the discussion above that the data value that is returned to the printer driver is a Boolean value that indicates either TRUE or FALSE. The printer driver 106 builds this query and passes it down through the print spooler 108 to the port monitor 110 (indicated by the encircled "1"). The port monitor translates the query into a protocol-appropriate format and communicates the query to the printer 114 (indicated by the encircled "2"). The printer receives the query and provides an answer back over the network (indicated by the encircled "3"). When the port monitor receives the answer (indicated by the encircled "4"), it translates the answer and provides the answer back up through the print spooler to the printer driver (indicated by the encircled "5").

When the printer driver 106 receives the answer, it can present associated information to the user via the UI component.

As additional examples, consider the following queries that can be generated by the printer driver:

| Desired Information | Query Form |
| --- | --- |
| Default input bin | \Printer.Layout.InputBins:CurrentValue |
| All input bins | \Printer.Layout.InputBins |
| All information from Input bin Tray1 | \Printer.Layout.InputBins.Tray1 |
| Is input bin Tray1 installed? | \Printer.Layout.InputBins.Tray1:Installed |
| Level of Black Toner | \Printer.Consumables.Toner.Black:Level |
| Level of Fuser Oil | \Printer.Consumables.FuserOil:Level |

In this particular embodiment, port monitors that know nothing about one another can receive the exact same query from the same printer driver, and either or both of the port monitors can respond. As should be apparent, a schema-aware printer driver need not know anything about the port monitors. The printer driver can build queries using a standardized schema that translates readily across different types of port monitors.

An advantage of this type of schema is that third party IHVs can write their own port monitors which can then plug into the architecture and, from a schema-aware printer driver's standpoint, be completely seamless and transparent.

Schema-Aware Printers

In some embodiments, the printer can be schema aware in that it can be directly queried using a schema query. In this instance, translation of the schema query may not need to occur.

CONCLUSION

The standard schema described above can be used to describe the capabilities of a peripheral device, such as a printer device, in a structured way. The schema can allow different peripheral device implementations to describe their capabilities in a consistent way to those entities that might query for the capabilities. The schema syntax can allow for direct querying of individual values, as well as for querying whole sections of the schema.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
building a protocol-independent query translatable across one or more port monitors, wherein each of the one or more port monitors has its own protocol-associated communication dialect, and wherein the query is configured to discover one or more properties or capabilities of a device, and wherein the query itself identifies the one or more properties or capabilities and is structured using a schema that comprises multiple nodes arranged in a hierarchical structure, wherein individual nodes are associated with the device's properties or data values, wherein one property node comprises a device information node that pertains to data that is associated with the device, and wherein the device information node comprises a child manufacturer node associated with a device manufacturer; and
communicating the query to the device.

2. The method of claim 1, wherein the act of building comprises building a schema string that defines the query.

3. The method of claim 1 further comprising, prior to said communicating, passing the query to at least one downstream component.

4. The method of claim 3 further comprising translating the query into a protocol-appropriate format for communication to the device to be queried.

5. The method of claim 3 further comprising translating the query into a protocol-appropriate format for communication to the device to be queried, wherein the act of translating is performed by at least one of the one or more port monitors.

6. The method of claim 1, wherein said act of building is performed by a device driver.

7. The method of claim 1, wherein the device information node further comprises a child name node associated with a definable device name.

8. The method of claim 1, wherein the device information node further comprises a child model name node associated with a device model name.

9. The method of claim 1, wherein the device information node further comprises a child location node associated with a current device location.

10. The method of claim 1, wherein the device information node further comprises a child comment node associated with information associated with the device that is provided by an administrator.

11. The method of claim 1, wherein one property node comprises a configuration node that pertains to configuration data that is associated with the device.

12. The method of claim 1, wherein one property node comprises a configuration node that pertains to configuration data that is associated with the device, and wherein the configuration node comprises a child memory node that contains values associated with the memory installed on the device.

13. The method of claim 1, wherein one property node comprises a configuration node that pertains to configuration data that is associated with the device, and wherein the configuration node comprises a child hard disk node that contains values associated with a hard disk installable on the device.

14. The method of claim 1, wherein one property node comprises a status node that pertains to a current state of the device.

15. One or more computer-readable storage media having computer-readable instructions thereon which, when executed, cause a computer to perform the method of claim 1.

16. A computer-implemented method comprising:
receiving, with a device, a query structured using a schema that describes the device's properties or capabilities, the query being configured to discover at least one but less than all of the device's properties or capabilities described by the schema, wherein the query is defined by a schema string identifying the properties or capabilities to be discovered, and wherein the schema comprises multiple nodes arranged in a hierarchical structure, wherein individual nodes are associated with the device's properties or data values, wherein one property node comprises a device information node that pertains to data that is associated with the device, and wherein the device information node comprises a child manufacturer node associated with a device manufacturer;

responsive to receiving said query, generating a response in a schema-appropriate format; and sending the response to an entity from which the query was received.

17. The method of claim 16, wherein the query has a format that is protocol-independent.

18. The method of claim 16, wherein the device information node further comprises a child name node associated with a definable device name.

19. The method of claim 16, wherein the device information node further comprises a child model name node associated with a device model name.

20. The method of claim 16, wherein the device information node further comprises a child location node associated with a current device location.

21. The method of claim 16, wherein the device information node further comprises a child comment node associated with information associated with the device that is provided by an administrator.

22. The method of claim 16, wherein one property node comprises a configuration node that pertains to configuration data that is associated with the device.

23. The method of claim 16, wherein one property node comprises a configuration node that pertains to configuration data that is associated with the device, and wherein the configuration node comprises a child memory node that contains values associated with the memory installed on the device.

24. The method of claim 16, wherein one property node comprises a configuration node that pertains to configuration data that is associated with the device, and wherein the configuration node comprises a child hard disk node that contains values associated with a hard disk installable on the device.

25. The method of claim 16, wherein one property node comprises a status node that pertains to a current state of the device.

26. The method of claim 16, wherein said device comprises a printer.

27. One or more computer-readable storage media having computer-readable instructions thereon which, when executed, cause a computer to perform the method of claim 16.

28. A computer-implemented method comprising:

building a protocol-independent query translatable across one or more port monitors, wherein each of the one or more port monitors has its own protocol-associated communication dialect, and wherein the query is configured to discover a printer's properties or capabilities, and wherein the query identifies the properties or capabilities, and wherein the query is structured using a schema that comprises multiple nodes arranged in a hierarchical structure, wherein individual nodes are associated with the printer's properties or data values, wherein one or more property nodes comprise at least one of:

a printer information node that pertains to data that is associated with the printer, wherein the printer information node comprises a child manufacturer node associated with a printer manufacturer;

a configuration node that pertains to configuration data that is associated with the printer, wherein the configuration node comprises:

a child memory node that contains values associated with the memory installed on the printer; wherein the memory node comprises a child node associated with memory size, and a child node associated with an amount of memory available to a Postscript interpreter, and a child hard disk node that contains values associated with a hard disk installable on the printer, wherein the hard disk node comprises a child node that represents whether a hard disk is installed on the printer, a child node that represents a capacity of an installed hard disk, and a child node that represents currently available free space of the installed hard disk; and a child duplex node that contains values associated with a duplex print attachment on the printer, wherein the duplex node comprises a child node that represents whether a duplex print unit is installed on the printer;

a consumables node that pertains to information associated with consumable supplies in the printer, wherein the consumables node comprises a child type node that corresponds to a consumable type on the printer, wherein the type node comprises a child color node that corresponds to a color of a consumable, and wherein the color node comprises a child installed node that represents whether a consumable is installed on the printer, a child display name node that represents a localized name for a particular consumable, and a child level node that represents a current level of a referenced consumable;

a layout node that pertains to data associated with how a print job is applied on a page, wherein the layout node comprises a child number up node that contains information associated with how many logical pages would be placed on a single page of media and which direction to layout multiple pages, wherein the number up node comprises a child pages per sheet node that contains values associated with how many data stream pages would be placed on a single side of a selected media, a child direction node that contains values associated with which order/direction to place local pages on a selected media;

a child orientation node that contains information associated with which orientation pages would be printed;

a child resolutions node that contains information associated with which print resolutions are supported by the printer; and a child input bin node that contains information describing device input bins, wherein the input bin node comprises a child current value node that represents the current default input bin, a child tray name node that is associated with individual input bins, wherein a child tray name node holds a value associated with a vendor-provided tray name, wherein child tray name nodes comprise a child installed node that represents whether a bin is installed, a child display name node that represents a localized name, a child media size node that represents the size of media available from an associated bin, a child media type node that represents the type of media available from an associated bin, a child media color bin that represents the color of media available from an associated bin, a child feed direction node that represents which paper edge enters a media path first for an associated bin, a child capacity node that represents capacity in sheets of an associated bin, and a child level node that represents a percent of remaining capacity for an associated bin;

a finishing node that pertains to how a print job is composed upon completion, wherein the finishing node comprises:
  a child collation supported node that represents whether the printer supports hardware collation of printed documents;
  a child jog offset supported node that represents whether the printer supports offsetting separate copies of a print job or separate print jobs in printer output trays;
  a child staple node that contains information describing the printer's stapling features, wherein the staple node comprises a child installed node that represents whether the printer has a stapling feature installed, a child location node that contains values associated with staple locations that are applied to output pages, and a child angle node that contains values associated with the angle at which staples are applied to output paces;
  a child hole punch node that contains information describing a printer's hole punch features, wherein the hole punch node comprise a child installed node that represents whether the printer has a hole punch feature installed, a child pattern node that pertains to hole punch patterns that are punched into output pages, and a child edge node that contains values that pertain to paper edges that holes are punched into output pages; and
  a child output bins node that contains information that describes a printer's output bins, wherein the output bins node comprises a child current value node that represents a current default output bin, and a child tray name bin associated with the name of an output bin;
a status node that pertains to a current state of the printer, wherein the status node comprises:
  a child summary node that contains values associated with a summary of the current printer state, wherein the summary node comprises a child state node that represents the processing state of the printer, and a child state reason node that represents selected reasons for a particular printer state; and
  a child detailed node that contains information associated with a detailed list of problems or information conditions currently active in the printer, wherein the detailed node comprises a child event node that contains information associated with a particular event; and
communicating the query to the printer.

29. The method of claim 28, wherein the act of building comprises building a schema string that defines the query.

30. The method of claim 28 further comprising, prior to said communicating, passing the query to at least one downstream component.

31. The method of claim 28 further comprising, prior to said communicating, passing the query to at least one downstream component, and further comprising translating the query into a protocol-appropriate format for communication to the printer to be queried.

32. The method of claim 28 further comprising, prior to said communicating, passing the query to at least one downstream component, and further comprising translating the query into a protocol-appropriate format for communication to the printer to be queried, and wherein the act of translating is performed by at least one of the one or more port monitors.

33. The method of claim 28, wherein said act of building is performed by a printer driver.

34. The method of claim 28, wherein the printer information node further comprises:
  a child name node associated with a definable printer name;
  a child model name node associated with a printer model name;
  a child location node associated with a current printer location; and
  a child comment node associated with information associated with the printer that is provided by an administrator.

35. One or more computer-readable storage media having computer-readable instructions thereon which, when executed, cause a computer to perform the method of claim 28.

* * * * *